3,544,461
STABILIZED DRILLING MUD
Daniel E. Boone, Tulsa, Okla., and Paul H. Ralston, Bethel Park, Pa., assignors, by direct and mesne assignments, to Calgon Corporation and Amerada Hess Corporation, both corporations of Delaware
No Drawing. Filed Dec. 5, 1966, Ser. No. 598,919
Int. Cl. C10n 3/30
U.S. Cl. 252—8.5                      8 Claims

ABSTRACT OF THE DISCLOSURE

Drilling mud having a high content of sodium chloride is stabilized by the nitrilotriacetamide or its acid salts, resulting in savings of mud, other chemicals, and other drilling costs.

BACKGROUND OF THE INVENTION

This invention relates to the treatment of drilling mud with nitrilotriacetamide or its acid salts to stabilize a condition of solution saturation of sodium chloride in the drilling mud.

In the drilling of oil wells and other types of wells, a drilling fluid or "mud" is almost always used to flush away the drilling wastes and fines. It is pumped down the hole being drilled, circulated around the drill bit where it picks up cuttings, and returned to the surface for removal of solids. Drilling fluids may be either aqueous or hydrocarbon media, usually containing various kinds of solids primarily to disperse the cuttings. High salt contents are often useful to increase the specific gravity of the mud, and saturated or partially saturated salt brines are commonly used where they are easily obtainable in the drilling area. There are many other factors involved in the mechanics of drilling.

One such factor is the tendency of the drilling mud to dissolve sodium chloride and other salts from the formations with which it makes contact. The dissolving of sodium chloride creates a cavity surrounding the well bore, which results in increased mud requirements and many other undesirable effects related to the mud volume. It has been necessary in the past to carry free crystalline salt in the mud system at the surface in order to insure saturated conditions at the bottom hole temperature. Differences between surface and bottom hole temperatures can be as much as 200° F. or more, which will affect the saturation concentration by about 40,000 mg./l. as sodium chloride. The free salt has an abrasive effect on the drill pipe, it impedes the progress of the drill bit by cushioning its bite, and tends to be removed by filters and screens designed to remove cuttings, thus rendering necessary the addition of more salt. Another factor is the tendency of sodium chloride and other solids to be deposited on the equipment or within the well bore when the mud travels from a saturated or near saturated high temperature zone to a lower temperature zone. The deposition of the salt tends to block the passage of the mud. Many other effects are noticeable due to the dissolution of salt formation contiguous to the well bore.

SUMMARY OF THE INVENTION

We have observed that the tendency to deposit solid sodium chloride on filters and equipment is greatly inhibited when nitrilotriacetamide or an acid salt thereof is employed. The tendency of the mud to dissolve sodium chloride from formations contiguous to the well bore is greatly reduced, having many beneficial effects.

The stabilizer maintains a condition of supersaturation with respect to sodium chloride as the mud passes from a zone of relatively high temperature to a zone of relatively low temperature. The acid salts which we may employ as stabilizers include the hydrochloric and sulfuric acid salts of nitrilotriacetamide. Any other acid salt thereof which is water soluble, such as acetic or phosphoric, etc. may be used, and have been shown to be effective in the laboratory.

Because of the smaller amount of salt dissolved from the formation, a lesser volume of mud is required, which reduces the quantity of water and treatment chemicals required for the mud, greatly reduces the quantity of cement used in cementing the bore hole, and reduces the fluid loss into the formation. Because it is not necessary to carry "free salt" in the system, the various disadvantages of having to do so are eliminated, e.g. the abrasive effect of the crystals is removed, the salt does not need to be replaced because it is not removed by the screens, and drilling progress is significantly improved. In addition, the drilling time is reduced at least partly because the mud does not carry "free salt."

Throughout this specification, when we refer to a saturated sodium chloride brine, we mean to include brines of mixed chloride salts such as magnesium and calcium chloride as well as sodium chloride. In such brines, sodium chloride is first to recrystallize from the saturated state.

In a field trial, a drilling fluid containing 330,000 mg./l. as NaCl at 68° F. on the surface was treated with 2000 mg./l. of nitrilotriacetamide throughout the drilling procedure. The concentration of 330,000 mg./l. as sodium chloride was calculated to be approximate saturation for the particular brine, which included high contents of calcium and magnesium salts. Calculations of sodium chloride content were based on analyses for chloride. As the drilling proceeded, the salinity of the mud was increased by surface addition of salt. At a point when the bottom hole temperature was 205° F., the salinity of the mud filtrate was measured at 345,000 mg./l. as sodium chloride, which was calculated to be saturation at 205° F. Cuttings from the salt sections of the formation were large and sharp, indicating little or no dissolution; there was virtually no change in the dissolved salt content of the drilling mud filtrate and no apparent recrystallization occurred.

In another field demonstration, nitrilotriacetamide was maintained in a salt saturated mud at 4000 mg./l. A penetration record was established for thearea, averaging 27.1 feet per hour while drilling.

In still another field demonstration the concentration of nitrilotriacetamide was varied somewhat, but averaged no more than about 200 mg./l. in the mud. During this drilling, the salinity retained around 330,000 mg./l. as NaCl calculated from the chloride content, while the same water used in a mud for drilling a nearby well but without nitrilotriacetamide treatment never attained more than 305,000 mg./l.

There appears to be no lower limit below which the salt stabilizer will have no effect; that is, a very small amount of nitrilotriacetamide or a salt thereof is effective to a very slight degree. Again, the practical upper limit of the addition of salt stabilizer will be dictated only by economics; we known of no reason why concentrations as high as 50,000 mg./l. or more could not be used, since the materials are soluble far beyond that point. Most applications will be within the range of about 100 mg./l. to 10,000 mg./l. It will seldom be advantageous to exceed 5,000 mg./l. Preferably about 200 mg./l. to about 4,000 mg./l. will be used.

The term "mg./l." as used throughout means milligrams of the subject constituent in each liter of total solution or brine. We do not intend to be bound by the above mentioned examples and illustrations. Our invention may be otherwise variously practiced within the scope of the following claims.

We claim:
1. Method of stabilizing an aqueous drilling mud substantially saturated with sodium chloride comprising treating said mud with at least about 100 mg./l. of a stabilizer selected from the group consisting of nitrilotriacetamide and its acid salts, and circulating the mud around the drill bit during the drilling process, whereby the tendency to form solid sodium chloride in the cooler parts of the mud circulating system is inhibited and the tendency of the mud to dissolve sodium chloride from the subterranean formation is inhibited.

2. Method of claim 1 in which the mud is treated with an amount of stabilizer from 200 mg./l. to 4000 mg./l.

3. In a well drilling process, in which an aqueous sodium chloride drilling mud undergoes increases of temperature in the well and decreases of temperature at the surface, a method of maintaining a condition of supersaturation of sodium chloride in the areas of decreased temperature comprising treating the drilling mud with a stabilizer compound selected from the group consisting of nitrilotriacetamide and its acid salts in an amount sufficient to inhibit the tendency of dissolved sodium chloride to crystallize and to inhibit the tendency of the drilling fluid to dissolve additional sodium chloride from the formation.

4. Method of claim 3 in which the mud is treated with an amount of stabilizer compound from 100 mg./l. to 10,000 mg./l.

5. Method of claim 3 in which the stabilizer is present in the mud in an amount from 200 mg./l. to 4000 mg./l.

6. Method of stabilizing an aqueous drilling mud saturated with sodium chloride comprising treating said drilling mud with at least about 100 mg./l. of a compound selected from the group consisting of nitrilotriacetamide and its acid salts.

7. A drilling mud consisting essentially of a saturated aqueous solution of sodium chloride, a dispersing agent, and at least about 100 mg./l. of a compound selected from the group consisting of nitrilotriacetamide and its acid salts.

8. A drilling mud consisting essentially of a saturated aqueous solution of sodium chloride including a dispersing agent and at least about 100 mg./l. of nitrilotriacetamide.

References Cited

UNITED STATES PATENTS 3,367,416  2/1968  Ralston et al. _____ 252—8.55 X

OTHER REFERENCES

Rogers, Composition and Properties of Oil Well Drilling Fluids, 3rd edition, pub. 1963 by Gulf Pub. Co. of Houston, Tex., pp. 475 to 481.

HERBERT B. GUYNN, Primary Examiner